Patented July 12, 1938

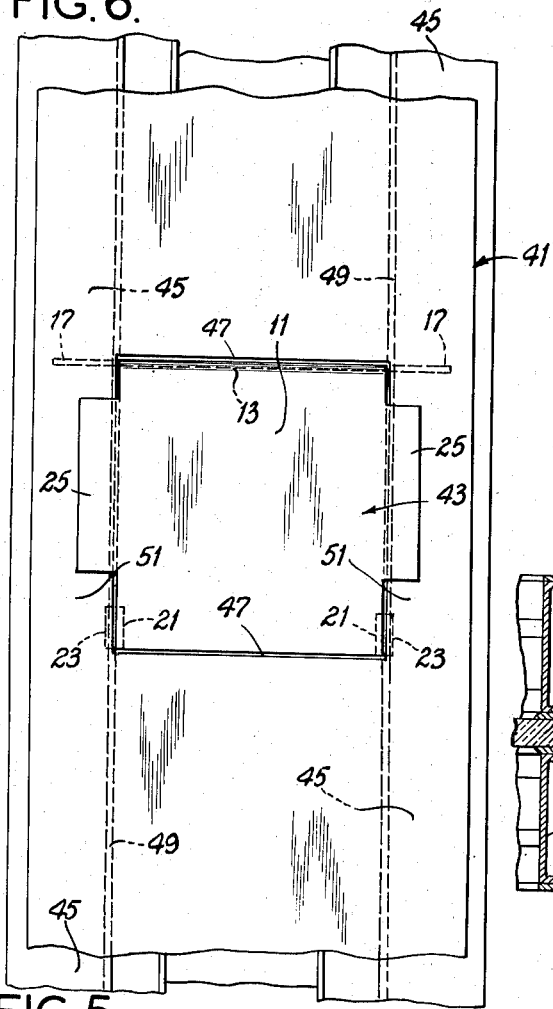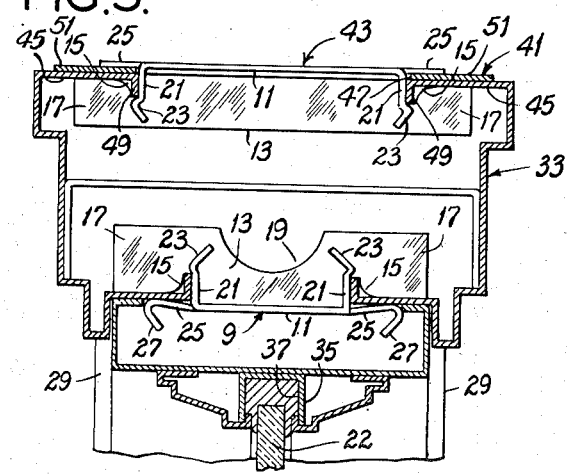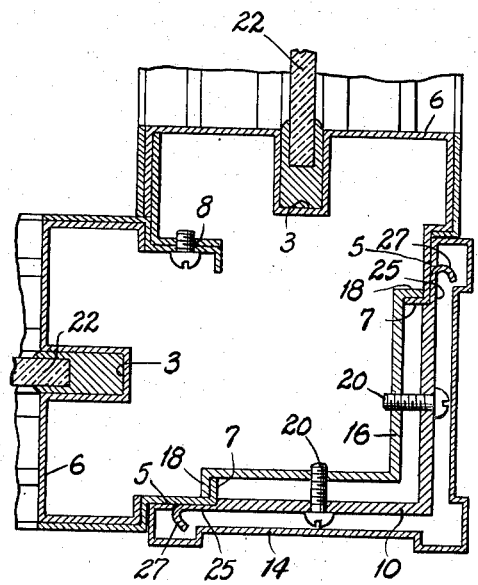

2,123,458

UNITED STATES PATENT OFFICE 2,123,458

STRUCTURAL HOLDING CLIP

Henry G. Woehler and Walter J. Woehler, St. Louis, Mo., assignors to Niedringhaus, Inc., St. Louis, Mo., a corporation of Missouri Application August 11, 1937, Serial No. 158,478

16 Claims. (Cl. 189—34)

This invention relates to structural holding clips, and with regard to certain more specific features to such clips for holding adjacent structural members and various types of covers therefor.

Among the several objects of the invention may be noted the provision of a structural holding clip which is adapted to hold and rigidly align in parallelism adjacent structural members such as pilasters and headers of panels and the like, and which are adapted to hold various covers, such as decorative pilaster strips, dust covers and the like; the provision of a clip of the class described which, although providing a high degree of accuracy and rigidity between the parts joined, may nevertheless easily be applied manually without the aid of tools, such as screw drivers, wrenches or the like; and the provision of a clip of the class described which has a simple one-piece form which is economical to manufacture. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is an isometric view showing a preliminary operation in applying a clip;

Fig. 5 is a vertical section of a header cornice showing the invention applied thereto in two different forms;

Fig. 6 is a plan view of Fig. 5; and,

Fig. 7 is a cross section showing another form of construction for corners.

Similar reference characters indicate corresponding parts throughout the several views of the drawings.

It has been known heretofore to use holding clips between adjacent members of structural panels and the like. The disadvantages of these have been manifold. They have been composed of three or more members of which it has been easy to lose a portion, thus destroying the value of a whole clip unit. They have required special tools for application, such as screw drivers, wrenches and the like, which make the work of application difficult. They have been costly, and at the same time have not produced the degree of rigidity in the final structures that the present invention does.

Figure 1:
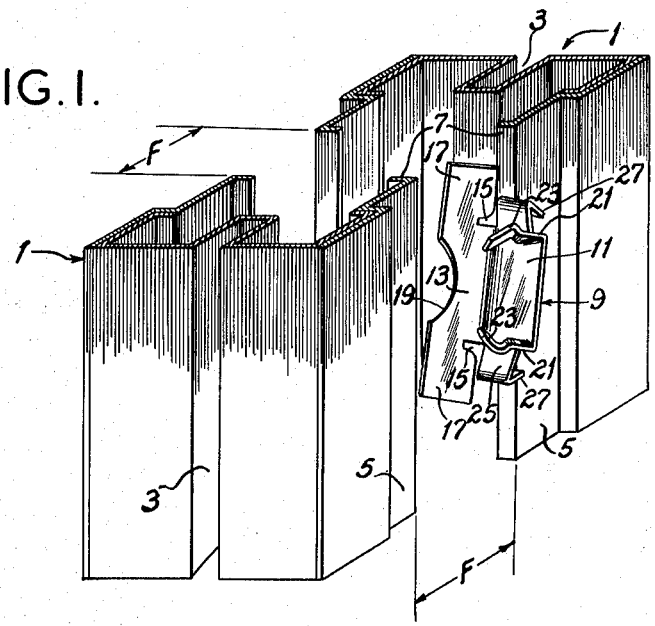

Referring now more particularly to Fig. 1, there is shown at numerals 1 a pair of vertical pilaster members. These are intended to illustrate generally the vertical metallic members which constitute the edges of certain building panels. They include recessed portions 3 for receiving panels 22 of any desirable material, such as metal or glass, wall-board or the like (see Fig. 4). It is to be understood that the members 1 need not form integral portions of panels, but may constitute independent pilasters which it may be desired to have joined together.

Each member 1 is recessed as shown to provide a shelf at 5. The inner edges of the shelves 5 are provided with inturned lips or flanges 7.

Numeral 9 indicates generally the clip which is the subject of the present invention. It is constituted by a flat body 11, one end of which is turned at a right angle to form a lateral wing 13. The lateral width of the wing 13 is preferably greater than that of the body portion 11 and reaches laterally beyond the inturned lips 7 of the upright pilasters 1.

Figure 2:
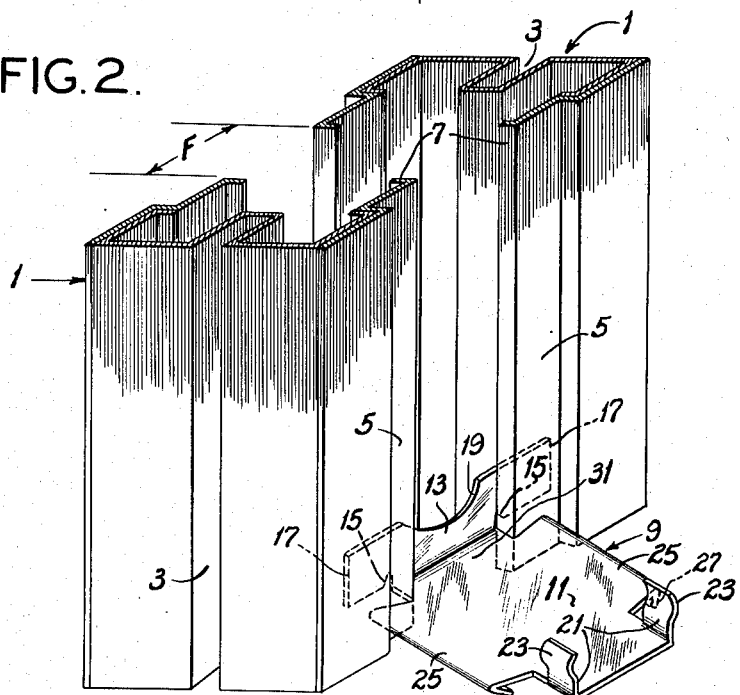
Fig. 2 is a view similar to Fig. 1 showing a second operation in applying the clip.
Figure 3:
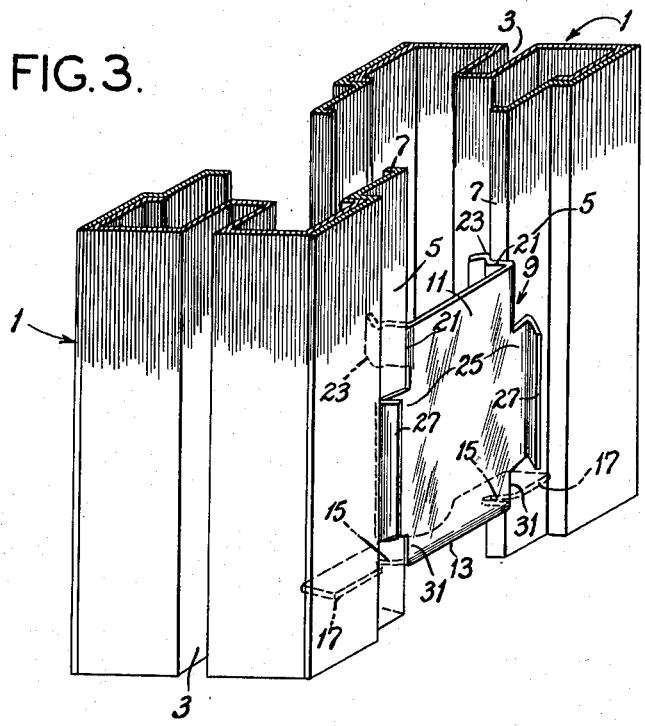
Fig. 3 is a view similar to Fig. 2 illustrating a final operation and the final position of the clip.
Figure 4:
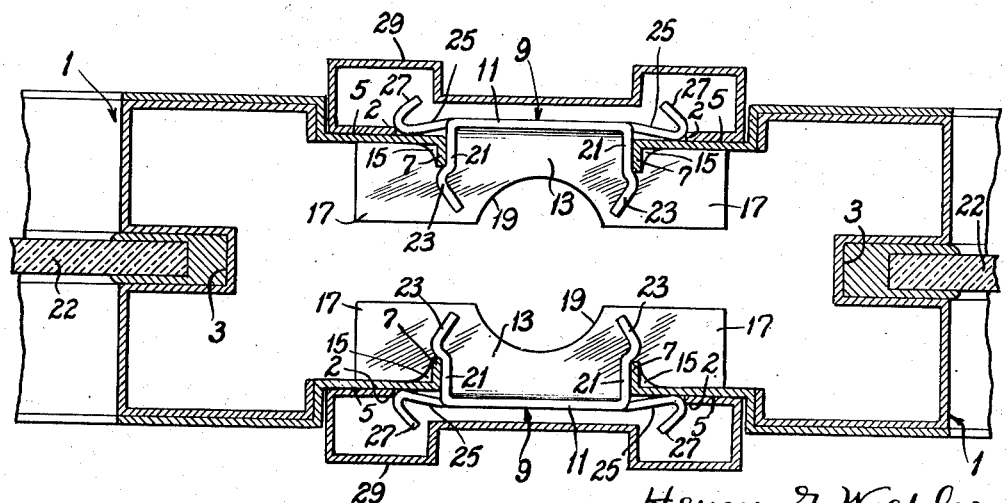
Fig. 4 is a plan view showing the members of Fig. 3 applied to joining two panels.

At points adjacent the lips 7 when the clip 9 is in the position shown in Fig. 2, the wing 13 is provided with notches 15 which are adapted to accommodate said lips 7 when the clip is turned into the position as shown in Fig. 3. The lateral end portions 17 of the wing 13 are contained in the space just behind said lips 7, as shown in Fig. 4. A notch 19 in the center of the wing serves a purpose to be described.

The end of the body 11 which is opposite the wing 13 is provided with right-angular springing, friction lugs 21 upon which are raised, crimped portions 23. The lugs 21 are spaced apart laterally a distance such that when they are pressed toward the lips 7, the raised, crimped portions 23 may springingly pass between the lips 7. At this time the body 11 has been rotated from the position of Fig. 2 to the position of Fig. 3. The clips finally spring into position behind said lips 7, as shown in Figs. 3 and 4.

The body portion 11 is also provided with lateral extending portions 25 which rest upon the shelves 5 when the clip is in the position shown in Figs. 3 and 4. As illustrated, the portions 25 are bent slightly out of the plane of the body portion 11 and toward the shelves 5 to provide a springing reaction to the spring-holding effect of the clipped portion 23, as will be shown. The edges of the extension 25 are bent back as illustrated at numeral 27 to provide a tapering guide and clincher groove for the application of decorative pilaster strips, such as shown at numerals 29 in Fig. 4. The pilaster strips 29 are not shown in Figs. 1–3, because these figures are intended to expose the clip per se.

Operation of the apparatus shown in Figs. 1–4 is as follows:

The body 11 of the clip is grasped by the workman who places the general plane of said body portion 11 approximately parallel to the directions of the parallel lips 7 (Fig. 1). When in this position, the wing 13 is pushed behind said lips 7 and then rotated from the position shown in Fig. 1 to the position shown in Fig. 2.

The width of the extending region 31 between the main body portion 11 and the right-angular juncture with the wing 13 (Figs. 2 and 3) is equal to the desired spacing between the lips 7 of the pilaster members 1. This spacing is marked "F" in the drawings.

Furthermore, the distance between the plane of the wing 13 and the adjacent ends of the lateral extensions 25 is such as to slidably accommodate the lips 7. Therefore, at the stage of the operation shown in Fig. 2, the clip may be readily moved up and down to attain any desired position.

Finally, the clip is rotated from the position shown in Fig. 2 to that shown in Fig. 3. This causes the notches 15 to embrace the lips 7 thereby spacing the pilasters 1 the desired amount. Then, by means of a blow on the body portion 11 from a block of wood or the like, or even by means only of the hand, the crimped portions 23 are springingly driven through spaced ends between the lips 7, whereupon they springingly take up a position behind said lips. Ultimately, the extensions 25 contact the bases of the recesses 5 and the lugs 21 come up against said lips 7.

It will be understood that more than one clip is used in the space between adjacent pilasters. As many as may be desirable are inserted.

Advantages of the clip are that as the wing 13 is rotated, the notches 15 hold the lips 7 from springing apart as would otherwise be required by the expanding action of the crimped portions 23. At the same time, after a complete rotation to the position shown in Fig. 3, the slight springiness of the extensions 25 provide the proper reaction to the holding crimps 23. As a result, the device effects an ultimate rigidity which is of a high order. This, coupled with its one-piece construction and simplicity of application, is advantageous.

As shown in Fig. 4, after a clip or a number of clips have been rotated into respective positions, such as also shown in Fig. 3, the necessary decorative pilaster strip, such as shown at 29, is simply pushed so that its inturned edges 2 spring into the recesses under the re-entrant portions 25. The lips 31 snap or clinch in behind the lateral extensions 25 and effect a suitable holding of the pilaster strip. The general C-shape of the pilaster strips gives them an inherent springiness wherewith the clinching is effected.

In Fig. 5 is shown an application of the invention to a cornice-like header 33 in which like numerals designate like parts. In this case there is a member 35 which carries a rabbet 37 for receiving another edge of the panel 22.

The primary function of Figs. 5 and 6 herein is to show the use of an alternative form of clip for holding in place a dust cover 41. This cover is shown on the top of Fig. 5. The clip used to hold the dust cover 41 is provided with the general index character 43, for purpose of identification in Figs. 5 and 6. Like numerals otherwise designate parts on this clip like those heretofore described on clip 9. It differs structurally from the form of clip shown in Fig. 9 only in that the lateral extensions 25 are not provided with any turned-over portion 27. This is because such portions are not necessary, as will appear.

The dust cover is merely an elongated strip of sheet metal adapted to cover the opening at the top of cornice members such as 33, or openings in like members. It rests upon the flanged portion or shelves 45 and has a plurality of openings 47 therein (only one of which is shown), each adapted to accommodate diagonal entry of the lateral wing 13, so that the notches 15 of said wing 13 may be applied behind the spaced lips 49 which are turned in along the shelves 45. Then by rotating the clip in the manner above described, its lugs 21 may be driven through the opposite end of the openings 47 to springingly cooperate with said lips 49.

It will be seen from the above that the lateral extensions 25 hold down the narrow portions 51 of the dust cover 41 which run adjacent to the openings. Thus the dust cover is positively held down by the extensions; whereas in the case of the pilaster strip 29, it is springingly clinched or snapped behind the members 25, 27. The purpose of the dust cover is to keep out of the hollow portions of the cornice, things that might descend into it, such as dust, pieces of plaster or the like. It is not necessary that the dust cover be a decorative cover, as is the case with the pilaster strip 29, and it therefore makes no difference that the clips appear through the holes 47. The bodies 11 of the clips substantially block the holes against entry of foreign material.

Inasmuch as the channels formed by the various members, such as the cornice member 33, and the pilasters 1, are used for stringing wires and the like, it is desirable that as much free opening as possible be provided, and that is the reason for the notch 19 in the wing 13 of each clip.

In Fig. 7 is shown how corner connections between panels and the like are completed. In this view the pilasters to be connected are indicated at numerals 6. Screw connections are used at 8 which leave a corner opening between lips 7. In order to close this opening, a corner member 10 is used which has lateral extensions 25, as in the case of the other forms of the invention described. These extensions 25 also have the turned-in portions 27 over which the pilaster strip 14 is clinched. The pilaster strip 14 is of the angle variety to suitably set off the corner.

In order to hold the member 10, an inside holding angle 16 is provided having lips 18 which are drawn or positioned behind the lips 7 by means of machine screws 20. A side elevation of the structure shown in Fig. 7 has not been shown, because all the elements appear in said Fig. 7. The length of the members 10, 14 and 16 is unimportant, because the member 16 can readily be manipulated to be placed behind the lips 7 by turning on a vertical axis.

If and when it becomes desirable to remove a clip of the form of Figs. 1–6, this may be simply done by using a prying instrument under the portion of the body portion 11 which is between the lugs 21. This springs the respective clip from the position shown in Fig. 3 to the position shown in Fig. 2. Thereafter, it is simply grasped by the hand and rotated into the position shown in Fig. 1, and withdrawn. Thus a structure may be as easily disassembled as assembled. This is sometimes desirable in temporary structural work, as in forming temporary booths and the like. However, it is to be understood that the primary application of the invention is to structures of a permanent, albeit interchangeable and removable in character.

It will be understood that the body portion 11 may be strengthened by forming therein pressed ribs or the like.

The shapes of the lateral members 27 are generally such as to provide means for clinching on a cover strip, and it is clear that various rolled-over shapes are available for this purpose, besides the one shown.

It is also to be understood that a single set of dimensions may be used for all clips, both of the pilaster-strip-holding and dust-strip-holding types. In this case, the turned-over portions 27 become mere surplusage when the device is used for dust-strip holding.

In view of the above it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. A clip for joining spaced structural members having adjacent parallel lips comprising, a body, an angularly related and laterally disposed wing at one end of said body adapted in one position to pass between said lips and having a span greater than the distance between the lips, the wing having notches for accommodating the lips, and spaced lugs at the opposite end of the body adapted to springingly engage said lips when said notches are positioned to accommodate the lips.

2. A clip for joining spaced structural members having adjacent parallel lips comprising, a body, a right-angular laterally and disposed wing at one end of said body adapted in one position to pass between the lips and having a span greater than the distance between the lips, the wing having notches for accommodating the lips when the wing is turned, and spaced lugs at the opposite end of the body adapted to springingly engage said lips when said notches are positioned to accommodate the lips.

3. A clip for joining spaced structural members having adjacent parallel lips comprising, a body, a laterally disposed wing at one end of said body adapted in one position to pass between the lips and having a span greater than the distance between the lips, the wing having notches for accommodating the lips, spaced lugs at the opposite end of the body adapted to springingly engage said lips when said notches are positioned to accommodate the lips, and lateral extensions from said body adapted to engage the structural members on their sides opposite the wing.

4. A clip for joining spaced structural members having adjacent parallel lips comprising a body, an angular and laterally disposed wing at one end of said body adapted in one position to pass between the lips and having a span greater than the distance between the lips, the wing having notches for accommodating the lips when the wing is turned, spaced lugs at the opposite end of the body adapted to springingly engage said lips when said notches are positioned to accommodate the lips, lateral extensions from said body adapted to engage the structural members, and portions on said lateral extensions adapted to effect a form over which a cover strip may be snapped.

5. A clip for fastening structural members having adjacent parallel portions comprising, a body portion, an angular and laterally disposed wing adapted to be inserted between said structural members and upon turning to span them and to become positioned behind the same, and frictional holding means at the other end of said body portion adapted to effect an expanding frictional hold between said structural portions.

6. A clip for fastening structural members having adjacent parallel lip portions comprising, a body portion, an angular and laterally disposed wing adapted to be inserted between said structural portions and upon turning to span them and to become positioned behind the same, said wing having notches adapted to receive said lips upon rotation, and frictional holding means at the other end of said body portion adapted to effect an expanding frictional hold between said structural portions, said wing resisting spreading of said structural members.

7. A clip for fastening structural members having adjacent parallel portions comprising, a body portion, an angular and laterally disposed wing adapted to be inserted between said structural portions and upon turning to span them and to become positioned behind the same, and frictional holding means at the other end of said body portion adapted to effect an expanding frictional hold between said structural portions, said wing being provided with means to resist separation of the structural members by the expansive force of said frictional holding means.

8. A clip for fastening structural members having adjacent parallel portions comprising, a body portion, an angular and laterally disposed wing adapted to be inserted between said structural portions and upon turning to span them and to become positioned behind the same, and frictional holding means at the other end of said body portion adapted to effect an expanding and frictional hold between said structural portions, and lateral extensions on the body portion adapted to engage said structural members on their sides opposite the side upon which they are engaged by the wing.

9. A holding clip for structural members having parallel lips, comprising a body portion, an angular wing at one end of the body portion having a span which is greater than the distance between said lips and having notches to accommodate said lips, spring-like lugs at the other end of the body portion and extending in the same direction as said wing, said lugs having crimps adapted to springingly take up positions between said lips, said body portion having lateral portions to hold a cover member.

10. A holding clip for structural members having lips comprising a body portion, an angular wing at one end of the body portion having a span which is greater than the distance between said lips and having notches to accommodate said lips, spring-like lugs at the other end of the body portion and extending in the same direction as said wing, said lugs having crimps adapted to springingly take up positions between said lips, lateral extensions from said body portion, said extensions having shapes at their edges adapted to permit the snapping thereover of a cover member.

11. In a building structure, adjacent members to be spaced and joined and parallel lips thereon, a one-piece clip comprising a body portion arranged to span a region between said lips, an angular wing forming an extension from said body portion and adapted to be positioned behind said lips, said wing having notches to accommodate said lips, spring-like lugs at the other end of said body portion and adapted to springingly take up a position between and behind said lips, and lateral extensions from said body portions adapted to engage the structural members on sides thereof which are opposite the sides which are engaged by said wing.

12. In a building structure, adjacent members to be spaced and joined and parallel lips thereon, a one-piece clip comprising a body portion arranged to span a region between said lips, an angular wing forming an extension from said body portion and adapted to be positioned behind said lips, said wing having notches to accommodate said lips, spring-like lugs at the other end of said body portion and adapted to springingly take up a position between and behind said lips, lateral extensions from said body portions adapted to engage the structural members on sides thereof which are opposite the sides which are engaged by said wing, said lateral extensions having shapes to provide re-entrant regions, and a cover strip having portions adapted to snap into said re-entrant regions.

13. In a building structure, adjacent spaced members having parallel lips thereon, a one-piece clip comprising a body portion arranged to span a region between said lips, an angular wing forming an extension from said body portion and adapted to be positioned behind said lips, said wing having notches to accommodate said lips, spring-like lugs at the other end of said body portion and adapted to springingly take up a position between and behind said lips, lateral extensions from said body portions adapted to engage the structural members on sides thereof which are opposite the side which is engaged by said wing, a dust cover adapted to engage said structural members and having an opening therein, said opening accommodating the application of said clip and having adjacent portions lying under said lateral extensions.

14. In a building construction parallel shelf members, a dust cover resting upon said shelf members and having at least one opening therein adjacent the space between said shelf members, a clip comprising a body portion, a lateral wing at one end of said body portion having a span greater than the distance between the inner edges of said shelf-like member, holding lugs at the other end of said body portion, lateral extensions from said body portion, said hole in the dust cover being adapted to permit application of said wing behind the shelf-like member, said clip thereafter being rotatable to permit springing engagement of said lugs between said shelf members, the lugs passing through said openings to make the engagement, and said portion substantially closing said opening.

15. A building construction comprising spaced, adjacent shelf portions, a one-piece clip comprising a body portion, an angular wing formed therewith adapted to be turned to take up a position on one side of said shelf portions, lateral extensions from the body portion adapted to take up a position on the opposite side of said shelf portions, and lugs at the end of said body portion opposite to the wing-end adapted to springingly engage between and behind said shelf portions.

16. A building construction comprising spaced, adjacent shelf portions, a one-piece clip comprising a body portion, an angular wing formed therewith adapted to be turned to take up a position on one side of said shelf portions, lateral extensions from the body portion adapted to take up a position on the opposite side of said shelf portions, and lugs at the end of said body portion opposite to the wing-end adapted to springingly engage between and behind said shelf portions, said lateral extensions having means for holding a cover strip.

HENRY G. WOEHLER.
WALTER J. WOEHLER.